United States Patent [19]

Atlee et al.

[11] E Re. 30,082

[45] Reissued Aug. 21, 1979

[54] X-RAY TUBE HAVING FOCUSING CUP WITH NON-EMITTING COATING

[75] Inventors: Zed J. Atlee, Tigard, Oreg.; Roy F. Kasten, Jr., Elmhurst, Ill.

[73] Assignee: Picker Corporation, Cleveland, Ohio

[21] Appl. No.: 645,835

[22] Filed: Jan. 27, 1977

Related U.S. Patent Documents

Reissue of:

[64] Patent No.: 3,783,323
Issued: Jan. 1, 1974
Appl. No.: 284,735
Filed: Aug. 30, 1972

[51] Int. Cl.[2] ..... H01J 35/00

[52] U.S. Cl. ..... 313/57; 313/60

[58] Field of Search ..... 313/57; 204/37 R, 192; 29/25.14, 25.17; 117/230

[56] References Cited

U.S. PATENT DOCUMENTS 2,671,867 3/1954 Atlee ..... 313/57

*Primary Examiner*—Rudolph V. Rolinec
*Assistant Examiner*—Darwin R. Hostetter
*Attorney, Agent, or Firm*—Watts, Hoffmann, Fisher & Heinke

[57] ABSTRACT

An x-ray tube is described including a focusing cup electrode coated with a high work function material, such as platinum or gold, to prevent the field emission of electrons from such cup. The method of applying the non-emitting coating is preferably sputtering or ion plating, but may also be electroplating followed by vacuum fusion in the case of gold or other low melting point metals.

11 Claims, 3 Drawing Figures

X-RAY TUBE HAVING FOCUSING CUP WITH NON-EMITTING COATING

Matter enclosed in heavy brackets [ ] appears in the original patent but forms no part of this reissue specification; matter printed in italics indicates the additions made by reissue.

BACKGROUND OF THE INVENTION

The subject matter of the present invention relates within a to x-ray tubes employing heated filament cathodes contained within focusing cup electrode, and in particular to such x-ray tubes in which a layer of high work function material is coated on the focusing cup to prevent the field emission of electrons therefrom.

Thermionic x-ray tubes having rotating anodes are operated at extremely high voltages, typically on the order of 100 kilovolts, so that there is a tendency for the focusing cup to emit electrons by field emission to the anode or to the cathode filament when the cup is negatively biased relative to such filament. This is a particular problem in condenser discharge x-ray systems and other systems employing coaxial cables or transformers of high secondary capacitance because the high voltage is stored in the capacitance across the x-ray tube so that any field emission from the focusing cup causes a high current discharge. The field emission of electrons from the focusing cup to the filament cathode can destroy such cathode, particularly if it is a thoriated tungsten filament cathode which is easily damaged by evaporation of thorium from the filament or contamination of the filament by the deposit of evaporated material from the focusing cup. In addition, during manufacture the unactivated filament cathode may be damaged by field emission from the focusing cup during "seasoning" as described in copending U.S. patent application Ser. No. 228,951, filed Feb. 24, 1972, by Z. J. Atlee et al., *now U.S. Pat. No. 3,846,006.*

These problems are avoided in the x-ray tube of the present invention by employing a non-emitting coating of high work function materials, such as platinum or gold, on the surface of the focusing cup electrode including the inner surface portions within the cup which are immediately adjacent to the cathode filament. In the preferred embodiment, a platinum coating is employed because of its higher work function and higher permissible operation temperature. The platinum is applied to the focusing cup by sputtering or ion plating which avoids melting the underlying focusing cup metal which would happen if a fusion coating method were employed due to the high melting point of platinum. Previously, it has been suggested [tht] *that* the anodes of high voltage rectifier tubes can be coated with a thin layer of gold over a thicker intermediate nickel layer provided on such anodes by electroplating and subsequent heating below 780° Centigrade, as discussed in U.S. Pat. No. 3,611,523 of E. S. Den Dulk, patented Oct. 12, 1971. However, heating above this temperature causes a low melting temperature alloy of gold and nickel to form which no longer has a high work function. However, this is impractical for coating the focusing cup of an x-ray tube because frequently such focusing cup is processed and operated at higher temperatures.

It is, therefore, one object of the present invention to provide an improved x-ray tube of longer useful lifetime in which the focusing cup electrode is coated with a non-emissive layer of high work function material.

Another object of the invention is to provide such an x-ray tube in which the coating of non-emissive material is applied to the focusing cup by a method which maintains the high work function of the material, results in good adherence and provides a smooth surface on such focusing cup.

Still another object of the present invention is to provide such a method in which the low emissive material is applied to the focusing cup base material by sputtering.

A further object of the invention is to provide such a method using ion plating.

A still further object of the invention is to provide such a method in which a low emissive material is applied to the focusing cup by electroplating followed by fusion.

An additional object of the present invention is to provide the focusing cup electrode of an x-ray tube with such non-emissive coating of a high melting point material, such as platinum, without melting the underlying base material.

BRIEF DESCRIPTION OF THE DRAWINGS

Other objects and advantages of the present invention will be apparent from the following detailed description of preferred embodiments thereof and from the attached drawings of which.

DESCRIPTION OF PREFERRED EMBODIMENTS

Figure 1:
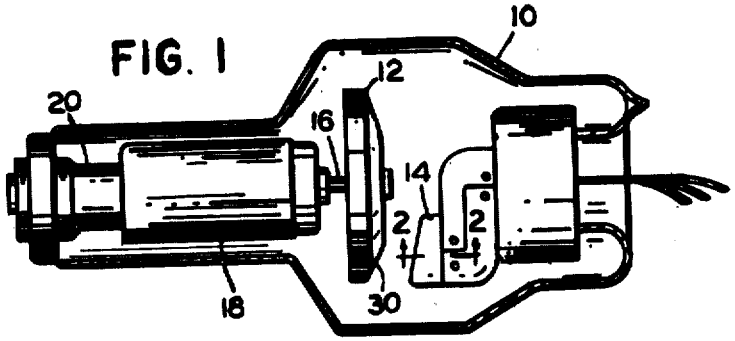
FIG. 1 is a plan view of an x-ray tube having a focusing electrode made in accordance with the present invention, with parts broken away for clarity.

As shown in FIG. 1, one embodiment of an x-ray tube made in accordance with the present invention includes an evacuated envelope 10 of glass containing a rotary anode 12 and a thermionic cathode assembly 14 supported at the opposite ends of such envelope in a conventional manner. Thus, the rotary anode 12 is attached by a rod 16 to a bearing sleeve 18 of magnetic material which is rotationally mounted on an inner shaft 20 for rotation by field coils (not shown) external to the envelope. The bearing sleeve 18 and anode 12 are supported on anode support shaft 20 which extends through a glass-to-metal seal in the left end of the envelope 10 for applying positive voltage to such anode.

The cathode assembly 14 includes a filament cathode 22 in the form of a coil of tungsten, thoriated tungsten, or other suitable electron emissive material. The filament cathode 22 is supported within a notch 24 in the focusing cup electrode 26. The focusing cup electrode 26 is provided with a cup-shaped focusing aperture 28 *having shaped focusing surfaces including a curved inner surface adjacent the cathode* flaring outwardly from the notch 24. As a result, the electrons emitted by the filament 22 are focused by *the shaped focusing surfaces of the focusing* cup 28 onto a target surface 30 of the rotary anode 12 to cause x-rays to be emitted therefrom and transmitted through the side of the envelope 10.

The focusing cup electrode 26 of the present invention includes a base member 32 of steel, nickel, molybdenum, or other suitable refractory material including ceramic, such as alumina, having a non-emissive coating 34 of high work function material, such as platinum or gold. The non-emissive coating 34 is provided on the upper surface of the focusing cup electrode 26, including the inner *shaped focusing* surface of the focusing cup aperture 28 and notch 24. The purpose of this non-emissive coating 34 is to prevent the field emission of electrons from the focusing cup electrode to either the cathode filament 22 or the anode 12, which results in damage to these elements. Thus, the cathode filament 22 includes end leads 36 which may be insulated from the focusing cup electrode 26 to enable a negative bias voltage of about −4 kilovolts to be applied between such filament and such focusing electrode so that the x-ray tube is quiescently biased nonconducting.

Figure 2:
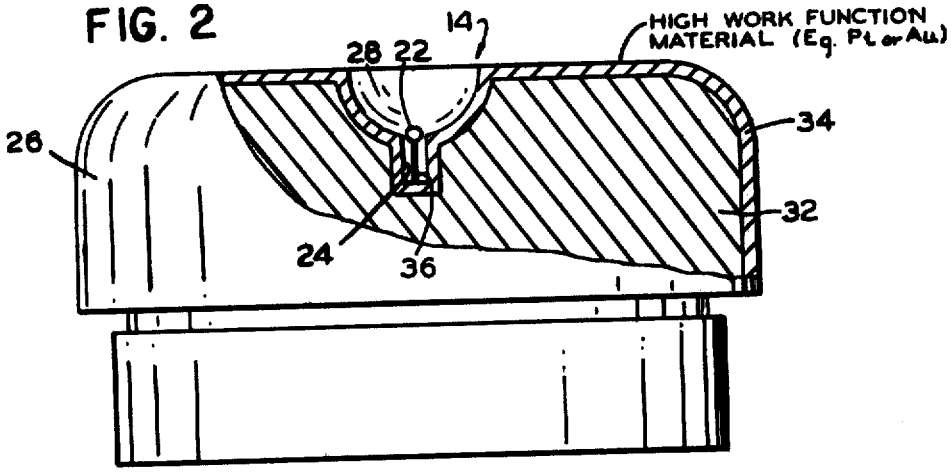
FIG. 2 is a partial horizontal section view taken along the line 2—2 of FIG. 1 on an enlarged scale.
Figure 3:
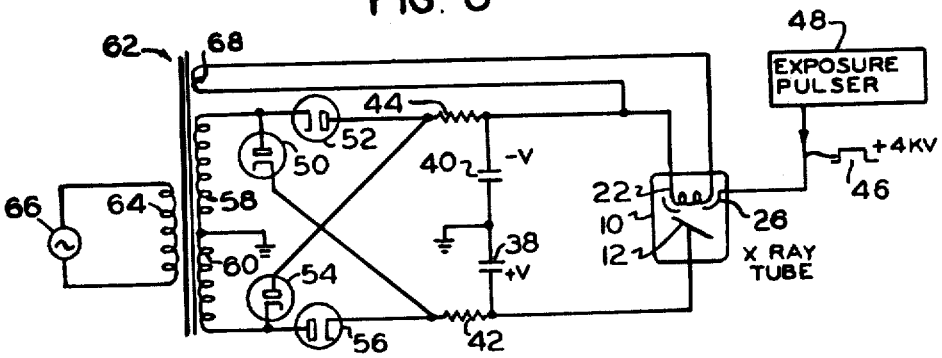
FIG. 3 is a schematic diagram of the electrical circuit of a capacitor discharge x-ray apparatus employing the tube of the present invention.

The x-ray tube of FIGS. 1 and 2 may be connected in a capacitive discharge x-ray circuit like that shown in FIG. 3, or such tube may be connected to coaxial cables or to a transformer of high secondary winding capacitance, so that a high capacitance on the order of one microfarad is connected across such tube. This capacitance acts as a voltage storage element which tends to cause an undesirable field emission or "cold cathode" type of an electron discharge from the focusing cup electrode 26 to the anode 12 or to the filament cathode 22. Thus, the anode 12 is connected through a first capacitance 38 to ground, while the cathode 22 is connected through a second capacitance 40 to ground. Capacitances 38 and 40 are charged slowly to about +60 kilovolts and −60 kilovolts, respectively, through charging resistances 42 and 44, respectively, and apply a total of 120 kilovolts D.C. across the anode and cathode of the x-ray tube while the focusing cup is quiescently biased at −64 kilovolts D.C. or −4 kilovolts relative to the cathode to cut off such tube. These capacitances are discharged rapidly through the x-ray tube 10 to produce an x-ray pulse when an exposure pulse 46 of about +4 kilovolts, relative to the quiescent voltage of the focusing cup, is applied by an exposure pulser circuit 48 to the focusing cup 26 to remove the quiescent reverse bias of −4 kilovolts applied to such focusing cup. Thus, the x-ray tube is rendered conducting for a period of time determined by the duration of the exposure pulse 46.

The storage capacitors 38 and 40 are connected through a rectifier bridge formed by four diodes 50, 52 54 and 56, across the secondary windings 58 and 60 of a high voltage transformer 62. The transformer has its primary windings 64 connected across the usual source of A. C. line voltage 66. The transformer may also be provided with a low voltage filament heater secondary winding 68 connected across the end terminals of the cathode filament 22, as well as the filaments of the rectifier diodes. It should be noted that a spark gap type of discharge switch may be connected in series between the x-ray tube anode 12 and the capacitor 38 when the focusing cup is connected to the cathode potential so that exposure pulser circuit 48 is not employed to switch the x-ray tube into a conducting condition. Such a spark gap discharge switch can be triggered or can be of the self-fire type which automatically breaks down after the voltage on the capacitor reaches the desired value.

The following is a description of three different methods for applying the non-emissive coating 34 to the focusing cup electrode. In the preferred embodiment of the invention, a non-emissive coating 34 of platinum or gold is deposited upon a focusing cup electrode base member 32 of steel by sputtering. Any suitable sputtering method can be employed, such as the triode sputtering method described in the article "Low-energy Sputtering" by J. W. Nickerson and R. Moseson, in Research/Development, March 1965, pages 52 to 56. Before sputtering, the focusing cup is machined to the desired shape, cleaned by electrolytic polishing and then dipped in a solution of trichloroethylene and placed in an ultrasonic cleaner containing liquid dichlorodifluoromethane, sold under the trademark Freon. Next, the cleaned focusing cup members are inserted into the sputtering apparatus which is evacuated to less than $3\times10^{-6}$ torr, and are sputter etched for about ten minutes at 300 watts of radio frequency power in an inert gas atmosphere of argon back filled to 7 microns pressure. In sputter etching the ions of inert gas are caused to bombard the surface of the focusing cup directly to remove any oxide or other foreign material and to thoroughly clean the surface for better adherence to the platinum. Next, the etched focusing cup members are indexed over a target of platinum or gold and spaced about one-half inch therefrom without removing them from the vacuum chamber. The target is then sputter deposited onto the surface of the focusing cup for about 5 minutes at about 1 kilowatt of radio frequency power in an argon atmosphere of 6.5 to 7.0 microns pressure to form the non-emissive coating 34.

In triode sputtering, electrons are emitted from a cathode and transmitted through argon or other inert gas to a separate anode, thereby ionizing the inert gas. The positive ions of inert gas are attracted to a target of the material to be sputter deposited which is at a more positive potential of about +50 volts so that the ions strike the target with sufficient energy to cause platinum or gold atoms to be sputtered from the target upon impact of such ions. These sputtered atoms of platinum or gold are transmitted in straight line paths to the focusing electrode substrate member to form the sputtered coating 34. It should be noted that this sputter deposition technique has the advantage that the platinum is not heated above its melting point in order to cause the coating 34 to adhere to the base material 32 which would cause melting of the base material due to the high melting point of platinum. However, once the sputtered platinum layer 34 is deposited, it may, if desired, be heated in a vacuum at about 1,000° Centrigrade for about 60 seconds to enhance the surface condition of the layer and improve its fusion with the base material 32. The filament cathode 22 is then assembled in the coated focusing cup electrode 26, and this assembly is mounted within the x-ray tube for further processing including evacuation and degassing at any suitable temperature.

Another method of depositing the non-emissive coating 34 is by ion plating, such as by the methods described in the article "Film Deposition Using Accelerated Ions" by D. M. Mattox in Electrochemical Technology, Sept.-Oct., 1964, pages 295 to 298, and in the article "Gas-Scattering and Ion-Plating Deposition Methods" by Curt D. Kennedy et al. in Research/Development, November, 1971, pages 40 to 44. In ion plating, the platinum, gold or other high work function material to be deposited is first vaporized by heating and the metal vapor is ionized. Heating and ionization may both be accomplished by electron beam bombardment of about 5 kilovolts of a target of the material to be deposited. The metal vapor ions are then accelerated through a high potential gradient of approximately 5 kilovolts to bombard the focusing cup electrode member being coated. The positive ions of platinum or gold are imbedded into the surface of the focusing electrode base member 32 to form the non-emissive layer 34. In order to increase the number of metal vapor ions generated, the secondary electrons emitted by the target may be utilized by placing the target in a magnetic field so that the secondary electrons travel in spiral paths through the metal vapor. In addition, a plasma or glow discharge can be produced between the substrate and the ion source by supplying a small amount of inert gas and increasing the voltage gradient. The ions of inert gas, as well as the ions of metal vapor, plasma-etch the surface of the substrate so that the non-emissive coating 34 penetrates and adheres better to the base material 32 of the focusing cup substrate. After ion plating, the coated substrate can, if desired, also be heated in a vacuum at about 1,000° Centrigrade for about 30 seconds to enhance the surface condition of the layer and improve its fusion with the base material as with sputtering. In addition, when gold is the sputter or ion plated material, the surface of the gold seems to be made smoother and more continuous, apparently due to surface melting.

A third method of applying gold as the non-emissive coating 34 involves electroplating and subsequent fusion in a vacuum. Prior to electroplating the focusing cup electrode member 32 is machined, cleaned, and electrolytically polished. Then a thin intermediate nickel layer about 0.0001 inch thick may be "flashed" onto the steel to provide better adherence of the gold non-emissive layer 34. However, this is optional. Next the focusing electrode member 32 is electroplated with gold to a thickness on the order of 0.001 inch. After electroplating, the gold layer 34 is then fused to the focusing electrode member 32 by heating it above its melting point to approximately 1,070° Centrigrade for about 30 seconds in a vacuum by radio frequency heating or other suitable heating techniques. This vacuum fusion also smooths the surface of the gold coating to provide a smooth continuous layer which further reduces the possibility of the field emission of electrons. After this, the filament cathode 22 is assembled in the coated focusing cup electrode and such assembly is mounted in the x-ray tube, which is then evacuated and baked for outgassing purposes.

It will be obvious to those having ordinary skill in the art that many changes may be made in the above-described preferred embodiments of the invention without departing from the spirit of the invention. For example, other high work function materials than platinum and gold can be employed as the non-emissive coating 34. Therefore, the scope of the present invention should only be determined by the following claims.

We claim:

1. An x-ray tube in which the improvement comprises:

an anode;

a focusing electrode *including a body having a focusing recess therein which defines a focusing surface;* a thermionic cathode mounted *in said recess* adjacent *said focusing surface of* said focusing electrode so that said focusing [electrode] *surface* focuses the electrons emitted by said cathode onto said anode to cause x-rays to be emitted from said anode;

an evacuated envelope containing said cathode, anode and focusing electrode; and a layer of non-electron emissive material provided on at least a portion of *said focusing surface* of the focusing electrode and having a higher work function than the underlying base material of said focusing electrode [substantially] to prevent the *field* emission of electrons from said focusing electrode.

2. A tube in accordance with claim 1 in which the non-emissive material is taken from the group consisting of gold and platinum.

3. A tube in accordance with claim 2 in which the cathode is a coiled filament.

4. A tube in accordance with claim 3 in which the filament contains thoriated tungsten.

5. A tube in accordance with claim 1 in which the layer of non-emissive material is a sputtered layer.

6. A tube in accordance with claim 5 in which the sputtered layer contains platinum.

7. A tube in accordance with claim 1 in which the [forming] *focusing* electrode includes a focusing cup within which a filament cathode is mounted, and the layer of non-emissive material is provided on the surface of said focusing cup.

*8. The x-ray tube of claim 1 wherein said focusing surface is a curved surface.*

*9. An x-ray tube comprising:*

*an evacuated envelope;*

*an anode mounted in the envelope and including an x-ray generating target area;*

*a cathode mounted in the envelope in spaced relationship with the anode and adapted to emit electrons toward the anode;*

*an electron focusing electrode mounted in the envelope and including a focusing surface shaped and positioned to focus electrons emitted by the cathode onto said target area;*

*conductor means connected to the anode, the cathode, and the focusing electrode for connecting each of them to sources of electric energy whereby to cause the focused flow of electrons from the cathode to said target area; and,*

*said focusing electrode being comprised of a base material and a coating of a nonelectron emissive inhibiting material having a higher work function than the base material, said coating forming at least a portion of said focusing surface whereby to prevent electron emission by the focusing electrode.*

*10. The X-ray tube of claim 9 wherein the nonelectron emissive material is sufficiently smooth that arcing between said cathode and said focusing surface is minimized.*

*11. The X-ray tube of claim 10 wherein said nonelectron emissive material is taken from the group consisting of gold and platinum.*

* * * * *